United States Patent
Takahashi et al.

(10) Patent No.: US 6,664,767 B2
(45) Date of Patent: Dec. 16, 2003

(54) VOLTAGE REGULATOR OF VEHICLE AC GENERATOR HAVING VARIABLE BYPASS CIRCUIT RESISTANCE

(75) Inventors: Keiji Takahashi, Kariya (JP); Toshinori Maruyama, Anjo (JP); Makoto Taniguchi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/891,222

(22) Filed: Jun. 26, 2001

(65) Prior Publication Data

US 2002/0024314 A1 Feb. 28, 2002

(30) Foreign Application Priority Data

| Jun. 26, 2000 | (JP) | ............................ 2000-191737 |
| Jul. 13, 2000 | (JP) | ............................ 2000-213090 |
| May 17, 2001 | (JP) | ............................ 2001-148258 |

(51) Int. Cl.[7] .......................... H02H 7/06; H02P 11/00; H02P 9/00
(52) U.S. Cl. ..................... 322/28; 322/17; 322/22; 322/23; 322/24; 322/25
(58) Field of Search ....................... 322/17, 22–25, 322/28

(56) References Cited

U.S. PATENT DOCUMENTS

| 3,593,121 A | * | 7/1971 | Jones ........................... 322/73 |
| 3,600,661 A | * | 8/1971 | Briggs et al. .................. 320/35 |
| 3,602,796 A | * | 8/1971 | Bleher ........................... 322/28 |
| 4,082,988 A | * | 4/1978 | Reime et al. ................. 318/139 |
| 4,143,289 A | | 3/1979 | Williams ..................... 310/156 |
| 4,220,908 A | * | 9/1980 | Nicol ............................ 322/33 |
| 4,297,631 A | | 10/1981 | Nicol et al. .................... 320/64 |
| 4,385,270 A | * | 5/1983 | Balan et al. .................... 322/23 |
| 4,409,539 A | * | 10/1983 | Nordbrock et al. ............ 322/28 |
| 4,471,287 A | * | 9/1984 | Morishita et al. .............. 322/99 |
| 4,486,702 A | * | 12/1984 | Edwards ....................... 322/28 |
| 4,549,128 A | * | 10/1985 | Morishita et al. .............. 322/99 |
| 4,563,631 A | * | 1/1986 | Mashino et al. ............... 322/33 |
| 4,980,629 A | * | 12/1990 | Bando et al. ................. 318/799 |

(List continued on next page.)

FOREIGN PATENT DOCUMENTS

| DE | 197 02 352 A1 | 1/1998 |
| JP | 5-83998 | 4/1993 |
| JP | 6-276796 | 9/1994 |
| JP | 6-284598 | 10/1994 |

*Primary Examiner*—Karl Tamai
*Assistant Examiner*—Pedro J. Cuevas
(74) *Attorney, Agent, or Firm*—Oliff & Berridge, PLC

(57) ABSTRACT

A voltage regulator of a vehicle AC generator includes a control circuit connected to a power circuit for supplying field current to a field coil of the AC generator, a power circuit for supplying electric power to the control circuit, a power drive circuit for controlling the power circuit according to a self-excited voltage induced in an armature coil of the AC generator, and a bypass circuit connected to a ground. The resistance of the bypass circuit is reduced when the power circuit does not supply electric power to the control circuit and is increased when the power circuit supplies electric power to the control circuit. Therefore, power consumption of the bypass circuit is reduced when the AC generator starts regular power generation.

13 Claims, 14 Drawing Sheets

U.S. PATENT DOCUMENTS

| | | | |
|---|---|---|---|
| 5,132,605 A | * | 7/1992 | Boella et al. .................. 322/99 |
| 5,140,253 A | * | 8/1992 | Itoh ............................ 322/28 |
| 5,182,511 A | | 1/1993 | Pierret et al. ........ 324/158 MG |
| 5,184,060 A | * | 2/1993 | Iwatani ........................ 322/99 |
| 5,319,299 A | * | 6/1994 | Maehara ...................... 322/28 |
| 5,376,876 A | | 12/1994 | Bauser et al. ................. 322/28 |
| 5,493,202 A | | 2/1996 | Iwatani et al. ................. 322/28 |
| 5,550,457 A | * | 8/1996 | Kusase et al. ................. 322/29 |
| 5,602,470 A | | 2/1997 | Kohl et al. .................. 324/177 |
| 5,663,632 A | * | 9/1997 | Roseman et al. ............. 322/59 |
| 5,689,175 A | * | 11/1997 | Hanson et al. ................. 322/28 |
| 5,748,463 A | * | 5/1998 | Tsutsui et al. .............. 363/127 |
| 5,801,516 A | * | 9/1998 | Rice et al. .................... 322/37 |
| 5,923,095 A | | 7/1999 | Iwatani et al. ............. 307/10.1 |
| 6,281,664 B1 | * | 8/2001 | Nakamura et al. ............ 322/22 |
| 6,346,797 B1 | * | 2/2002 | Perreault et al. ............... 322/29 |
| 6,548,993 B1 | * | 4/2003 | Rutyna et al. ................. 322/36 |
| 6,555,993 B2 | * | 4/2003 | Taniguchi et al. ............ 322/28 |
| 6,566,845 B2 | * | 5/2003 | Taniguchi et al. ............ 322/28 |

* cited by examiner $\zeta_1 = 30\text{e-deg}$

VOLTAGE REGULATOR OF VEHICLE AC GENERATOR HAVING VARIABLE BYPASS CIRCUIT RESISTANCE

CROSS REFERENCE TO RELATED APPLICATION

The present application is based on and claims priority from Japanese Patent Applications: 2000-191737 filed Jun. 26, 2000; 2000-213090, filed Jul. 13, 2000 and 2001-148258, filed May 17, 2001, the contents of which are incorporated herein by reference.

BACKGROUND OF THE INVENTION

1. Field of the Invention

The present invention relates to a voltage regulator of a vehicle AC generator.

2. Description of the Related Art

In an AC generator, a switch is connected in series with a field coil to turn on if a voltage of a phase-winding becomes higher than a predetermined value. In this generator, field current is supplied to the field coil when this generator starts generation. However, if a leak current flows in the armature coil due to short-circuiting, a noise voltage is caused by the leak current. If this noise voltage is detected as a generation-start signal, field current is erroneously supplied to the field coil.

JP-A-6-276796 proposes a voltage regulator that solves the above stated problem. The voltage regulator has a generation detection circuit that has a terminal connected to a phase-winding of an AC generator and a bypass resistor that is connected between the terminal and a ground. The bypass resistor bypasses most of the leak current that flows into the armature coil.

In order to prevent erroneous detection of the generation start signal, it is important to lower the resistance of the bypass resistor. However, when the output power is generated and output current flows through the bypass resistor, the bypass resistor consumes a considerable electric power. This lowers the efficiency of the AC generator and heats the portions of the voltage regulator surrounding the bypass resistor.

Each of JP-A-3-215200, JP-A-6-284598 and PCT International Publication 8-503308 discloses a signal detection circuit that detects and amplifies a voltage difference between two phase-coils. This detection circuit can correctly detect the generation start signal even if leak current flows into the armature coil.

However, such a signal detection circuit necessitates complicated wiring arrangement in the AC generator, thereby increasing parts and man-hour.

In addition, such a detection circuit that detects residual magnetic flux needs a rectifier unit for rectifying a self-excited AC voltage and a comparator for comparing the rectified voltage and a reference voltage. Because such self-excited voltage to be detected when an engine is started is about 0.4 V, it is very difficult to rectify such low AC voltage and to compare it with a reference voltage accurately.

SUMMARY OF THE INVENTION

Therefore, a main object of the invention is to provide a simple voltage regulator of a vehicle AC generator that can detect such self-excited voltage accurately.

A voltage regulator according to a feature of the present invention, comprises first means for detecting the voltage level or frequency of a self-excited voltage induced in a phase-winding, second means for supplying field current to a field coil when the self-excited voltage is detected, and third means including a bypass circuit connected to a ground, for reducing resistance of the bypass circuit when the second means does not supply the field current and increasing the resistance of said bypass circuit when the second means supplies field current to the field coil.

Even if leak current flows into the armature coil while detecting the self-excited voltage, the leak current can be eliminated by bypassing it through the bypass circuit, so that the self-excited voltage can be detected accurately. After the self-excited voltage is detected, the resistance of the bypass circuit is increased to thereby decrease power consumption by the bypass circuit.

A voltage regulator according to another feature of the invention comprises a switching circuit for controlling field current to be supplied to the field coil, a switch control circuit for controlling the switching circuit according to a self-excited voltage induced in a phase-winding, a power circuit connected to the switch control circuit and a power-circuit drive circuit including a pulse conversion circuit for converting the self-excited voltage into a binary pulse signal. The power-drive circuit drives the power circuit for a period controlled by the pulse signal.

If a peak voltage of the self-excited voltage becomes a threshold level for the binary pulse signal, the power circuit supplies the field coil of the AC generator with field current that corresponds to the binary pulse signal. The duty ratio of the pulse signal and the field current increase as the rotation speed of the generator increases. Therefore, the AC generator is prevented from abruptly generating the output power. It is not necessary to provide a rectifier unit for rectifying the excited voltage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
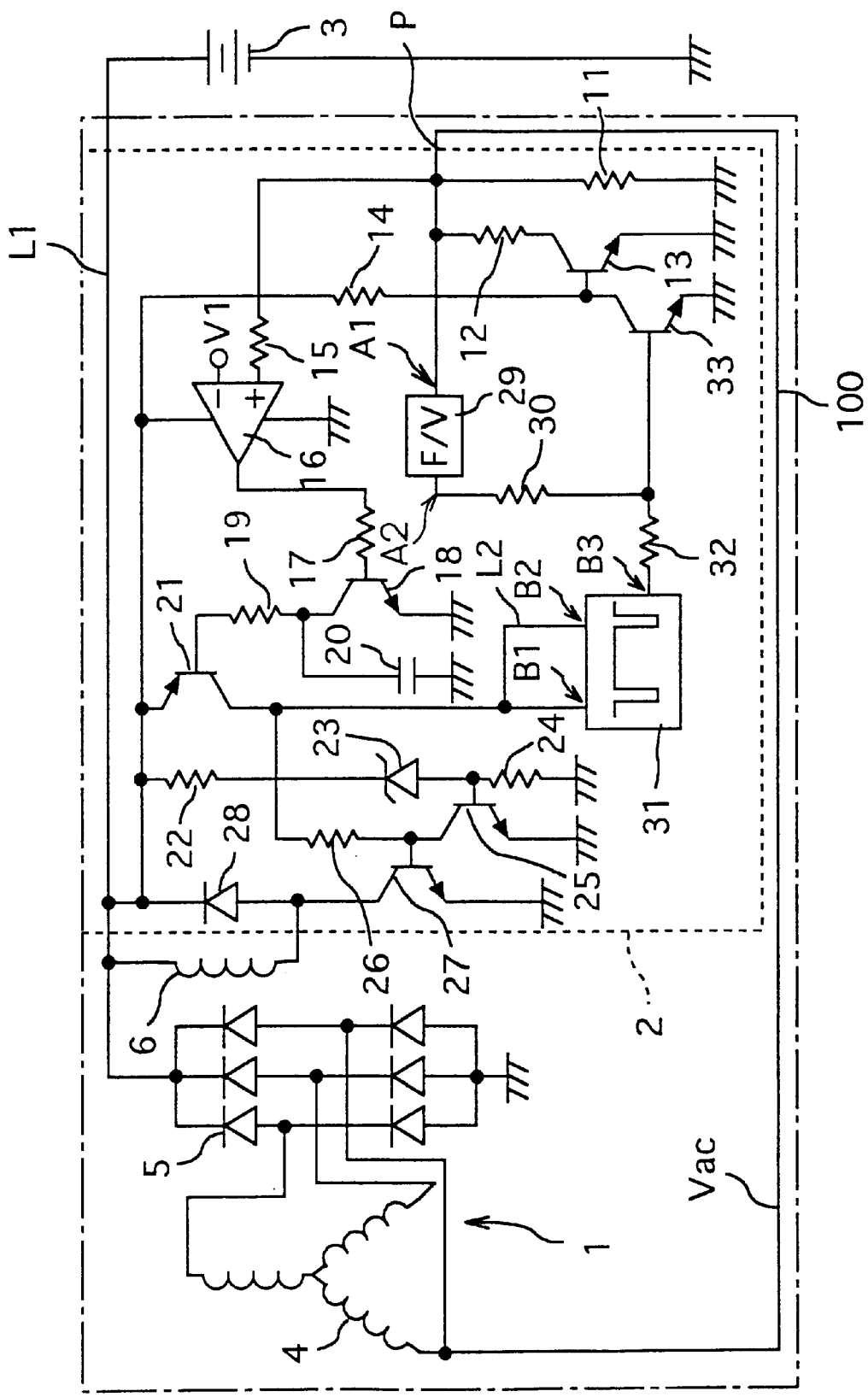
FIG. 1 is a circuit diagram of an AC generator that includes a voltage regulator according to a first embodiment of the invention.

A voltage regulator 2 of a vehicle AC generator 1 according to a first embodiment of the invention is described with reference to FIG. 1. The AC generator 1 has a three-phase star-connected armature coil 4, a three-phase full-wave rectifier 5 and a field coil 6. The armature coil 4 has three phase-windings that are respectively connected to the rectifier 5 so that AC power induced by the phase-windings can be converted into DC power, which is supplied to a battery through a power supply line L1.

The voltage regulator 2 is mounted in the AC generator 1. The voltage regulator 2 is mainly comprised of a detection line 100, a resistor 12, a transistor 13, a resistor 15, a comparator 16, a resistor 17, a transistor 18, a resistor 19, a capacitor 20, a pnp transistor 21, voltage dividing resistors 22 and 24, a Zener diode 23, a power line L1, an internal power line L2, a current limiting resistor 26, a switching transistor 27, an F-V converter 29, an oscillation circuit 31 and a transistor 33.

When a rotor of the generator 1 rotates, a self-excited voltage is induced in each phase-winding by residual magnetic flux of the poles. As shown in FIG. 1, the self-excited voltage Vac that is induced in one of the three phase coils is applied to a positive terminal of the comparator 16 through the detection line 100 and the resistor 15 and compared with a reference voltage V1. If the self-excited voltage Vac is higher than the reference voltage, e.g. 0.4 V, the comparator 16 turns on the transistor 18, via the resistor 17 that is connected to the base terminal of the pnp transistor 21, to change the potential of the resistor 19 from a high level to a low level, thereby turning on the transistor 21. Accordingly, the transistor 21 supplies electric power from the power line L1 to the internal power line L2 to increase the potential of the internal power line L2 up to the potential of the power line L1.

The capacitor 20 is connected between the collector of the transistor 18 and a ground. The capacitor 20 holds the transistor 21 turning on without regard to the operation of the comparator 16 for a longer period than a cycle time of the negative output voltage induced in one of the three phase-windings. As a result, the transistor 21 continues to supply electric power to the internal power line L2.

The internal power line L2 is connected to the base electrode of the switching transistor 27 via the current limiting resistor 26. When the transistor 21 is turned on, the switching transistor 27 is turned on to supply field current to the field coil 6 from the power line L1 to make the AC generator start regular generation. In the meantime, the pnp transistor 21 functions as a switch for supplying power to a control circuit that controls the transistor 27, which is comprised of the resistors 22, 24, the Zener diode 23, and the transistor 25.

When the transistor 21 is turned on, input terminals B1 and B2 of the oscillation circuit 31 are connected to the power line L2. Consequently, the oscillation circuit 31 generates an oscillation signal that has longer high-level durations than low-level durations at an output terminal B3. This oscillation signal is applied to the base electrode of the transistor 33 to turn on and off periodically. The collector of the transistor 33 is connected to the base of a transistor 13 so that the transistor 13 can periodically turn off and on. Accordingly, the current flowing through the resistor 12 is controlled so that generation of heat can be controlled while the transistor 21 is turned on.

If the rotation speed of the vehicle engine increases to an idling speed, the frequency of the self-excited voltage Vac becomes higher than a predetermined frequency, and the output terminal of the F-V converter 29 provides a high level voltage signal. As a result, the transistor 33 is turned on and the transistor 13 is turned off regardless of the output signal of the oscillation circuit 31. This eliminates power consumption by the resistor 12.

If the voltage Vac becomes higher than a voltage that is decided by the Zener diode 23 and the voltage dividing resistors 22 and 24, the transistor 25 is turned on to turn off the switching transistor 27. Consequently, the field current is cut off, and the output voltage of the AC generator 1 decreases.

If the engine stops, the frequency of the voltage Vac becomes zero. As a result, the output terminal of the F-V converter 29 provides a low-level voltage signal, so that the transistors 33 and 13 operate according to the output signal of the oscillation circuit 31. If the transistor 13 is turned on, the positive terminal of the comparator 16 becomes lower than the input voltage V1 thereof on the negative terminal thereby turning off the transistor 18. The low-level duration of the oscillator 31 is set to be longer than a delay period decided by the capacitor 20 and the resistor 19, so that the transistor 21 can be surely turned off. This ensures complete cut supply of the field current of the generator 1 when the engine stops.

Even if a leak current flows from the outside into the detection line 100, the leak current can be discharged through the resistor 12 and the transistor 13. Therefore, the potential of the terminal P can be prevented from being affected by the leak current. Because the leak current flows into the detection line 100 through a portion having very high internal resistance, the voltage drop across the resister 12 can be neglected.

Figure 3:
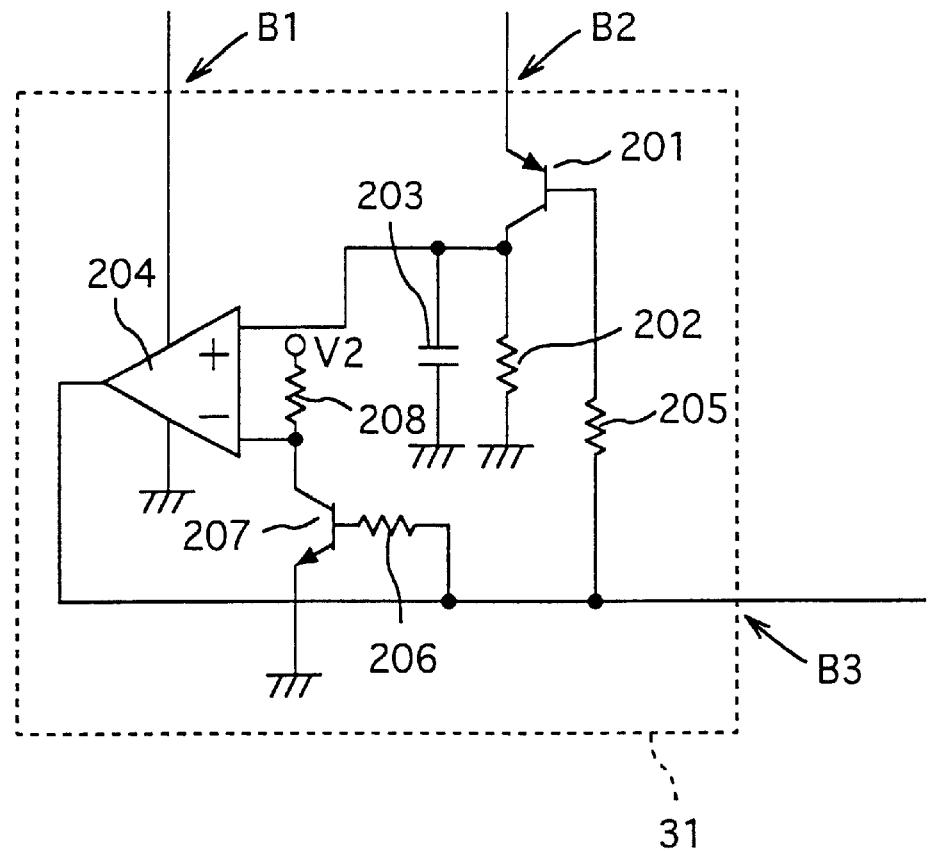
FIG. 3 is a circuit diagram of an oscillation circuit of the voltage regulator according to the first or second embodiment.

As shown in FIG. 3, the oscillator 31 is mainly comprised of a transistor 201 that is connected to the terminal B2, a resistor 202, a capacitor 203, a comparator 204 and a transistor 207. The resistor 202 is connected in parallel with the capacitor 203, and the capacitor 203 is connected to the positive input terminal of the comparator 204.

The oscillator 31 is powered from the terminal B1. If the voltage of the terminal B2 becomes higher than a reference voltage of the comparator 204, the output terminal B3 of the comparator 204 provides a high level voltage. Consequently, the transistor 201 is turned off, and an electric charge of the capacitor 203 is discharged through the resistor 202. The transistor 207 is also turned on, so that the negative terminal of the comparator 204 provides a low-level reference voltage. Consequently, the output terminal B3 of the comparator 204 maintains the high-level voltage.

If the voltage of the capacitor 203 becomes lower than the low-level reference voltage, the output terminal B3 of the comparator 204 provides a low-level voltage, and a high-level voltage is applied to the negative input terminal of the comparator 204. The transistor 201 is turned on since the base current is supplied thereto, and the terminal voltage of the capacitor 203 becomes high in a short time. If the terminal voltage of the capacitor 203 becomes higher than the high level reference voltage of the comparator 204, the output terminal B3 of the comparator 204 provides the high-level voltage again. The duration of the high-level voltage is longer than the duration of the low-level voltage, and the above operation is repeated.

Figure 4:
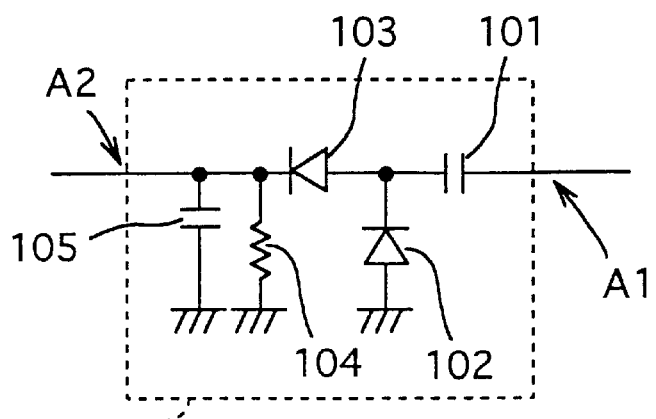
FIG. 4 is a circuit diagram of a F/V converter of the voltage regulator according to the first or second embodiment.

The F-V converter 29 is comprised of a capacitor 101, diodes 102 and 103, a parallel resistor 104 and a capacitor 105, as shown in FIG. 4. If the voltage of the input terminal A1 of the F-V converter 29 increases, electric current flows into the capacitor 105 through the capacitor 101 and the diode 103. On the other hand, if the voltage of the input terminal A1 decreases, the electric charge of the capacitor 101 is discharged through the diode 102, and also the electric charge of the capacitor 105 is discharged through the parallel resistor 104. Therefore, the voltage of the capacitor 105 lowers gradually. If the frequency of the voltage applied to the terminal A1 increases, the voltage across the capacitor 105 increases, and the terminal A2 provides a high-level voltage.

Figure 2:
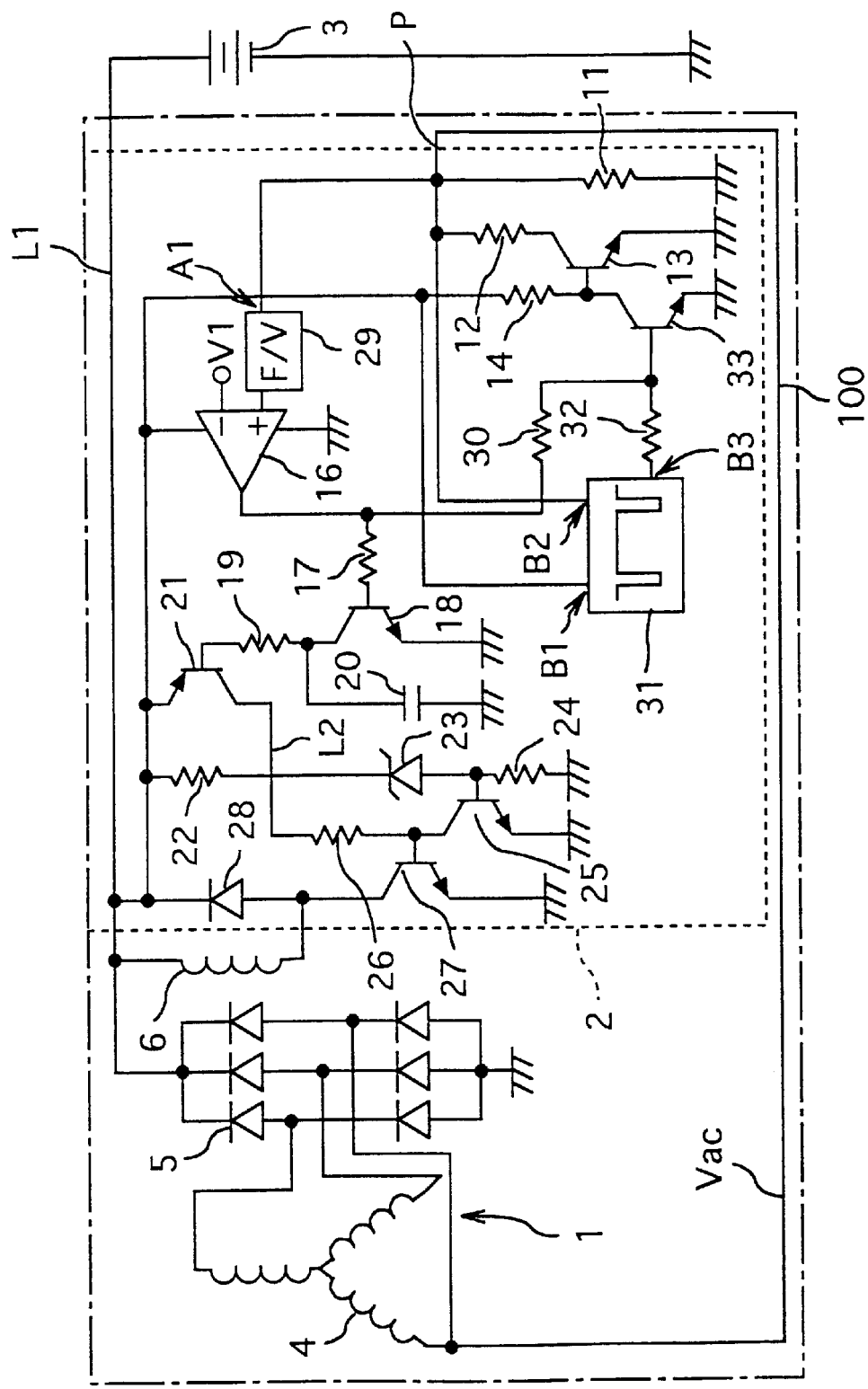
FIG. 2 is a circuit diagram of a voltage regulator according to a second embodiment of the invention that is disposed in a vehicle AC generator.

A voltage regulator according to a second embodiment of the invention is described with reference to FIG. 2. The F-V converter 29 is connected to the positive terminal of the comparator 16.

If the rotor of the AC generator 1 rotates and the self-excited voltage Vac is generated by the residual magnetic flux, the voltage Vac is applied to the terminal P. The F-V converter 29 provides the positive terminal of the comparator 16 with a voltage higher than V1 if the frequency of the self-excited voltage Vac becomes higher than a predetermined frequency to change the output voltage of the comparator to the high-level voltage. As a result, the field coil 6 of the AC generator 1 is supplied with field current and generates the regular output power to be charged to the battery 3.

The comparator 16 provides a high-level voltage while the AC generator 1 operates, and the transistor 33 is turned on to turn off the transistor 13, thereby cutting off the bypass resistor 12. Thus the energy consumption by the bypass resistor 12 can be eliminated.

If the rotor of the AC generator 1 stops rotation, the comparator 16 provides a low-level voltage, and the transistor 33 is controlled by the oscillator 31. If leak current causes armature coil 4 to generate a voltage higher than a threshold level, the oscillator 31 detects the voltage at the terminal B2 and provides the transistor 33 with the output oscillation signal through the resistor 33. Accordingly, the transistor 33 turns on and off the transistor 13 to control the heat generation of the resistor 12.

A voltage regulator according to a third embodiment of the invention is described with reference to FIGS. 5–15.

The vehicle AC generator 1 includes U-phase-winding 41, V-phase-winding 42, a first rectifier unit 51 connected to the phase-winding 41, a second rectifier unit 52 connected to the phase-winding 42, a smoothing capacitor 55, a field coil 6 and a voltage regulator 200 according to a third embodiment of the invention.

The voltage regulator 200 is comprised of a switching transistor 71, a flywheel diode 72, a transistor control circuit 73, a power circuit 74 and a power drive circuit 75. The switching transistor 71 corresponds to the switching transistor 27 of the voltage regulator according to the first embodiment, shown in FIG. 1.

The power circuit 74 is a well-known circuit for supplying power to the control circuit 73. The power circuit 74 may be comprised of a constant voltage circuit or a circuit connecting an ignition terminal and the control circuit 73. The control circuit 73 includes a comparator that compares battery voltage with a reference voltage to control the switching transistor 71. The control circuit 73 corresponds to the circuit that is comprised of the voltage dividing resistors 22 and 24, the Zener diode 23 and he transistor 25 of the voltage regulator shown in FIG. 1.

The U-phase and V-phase-windings are 90° in electric angle different from each other. The first rectifier unit 51 rectifies full-waves of the output voltage of the U-phase-winding 41, and the second rectifier unit 52 rectifies full-waves of the output voltage of the V-phase-winding.

Figure 6:
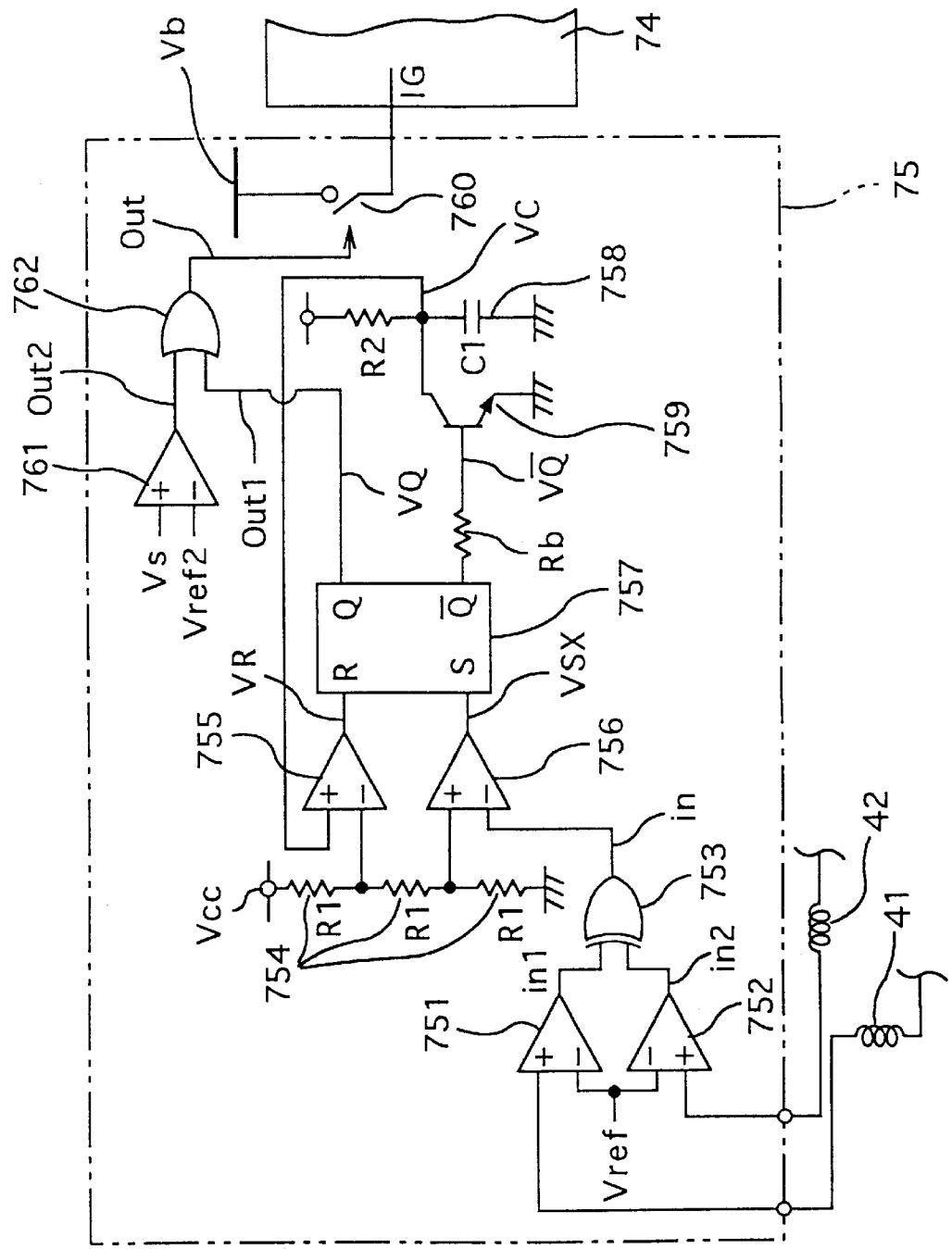
FIG. 6 is a circuit diagram of a portion of the voltage regulator according to the third embodiment.

The power drive circuit 75 is comprised of a first comparator 751, a second comparator 752, an exclusive OR circuit 753, a voltage dividing circuit 754, comparators 755 and 756, an RS flip-flop circuit 757, a CR circuit 758, a transistor 759, an analog switch 760, a comparator 761 and an OR circuit 762, shown in FIG. 6.

The first comparator 751 compares the output voltage of the U-phase-winding with a reference voltage Vref. The second comparator 752 compares the output voltage of the V-phase-winding with a reference voltage Vref. The exclusive OR circuit 753 is connected to the output terminals of the first and second comparators 751 and 752. The exclusive OR circuit 753 may be substituted by a coincidence circuit. The voltage dividing circuit 754 includes resistors R1, R2 and R3 that are connected in series between a power source that provides a constant voltage Vcc and a ground. The comparator 755 compares an output voltage of the CR circuit 758 with ⅔ Vcc that is provided by the voltage dividing circuit 753. The second comparator 756 compares the output signal of the exclusive OR circuit 753 with ⅓ Vcc that is provided by the voltage dividing circuit 754. The RS flip-flop circuit is connected to the comparator 755 at the reset terminal thereof and to the comparator 756 at the set terminal thereof. The CR circuit 758 is comprised of a series circuit of a capacitor C1 and a resistor R2. The CR circuit 758 may be substituted by a digital counter and the like. The inverted Q terminal of the RS flip-flop circuit 757 is connected through a resistor Rb to the base electrode of the transistor 759, which discharge the capacitor C1 when it is turned on. The comparator 761 compares a divided voltage Vs of DC output voltage Vb of the AC generator 1 with a reference voltage Vref. Input terminals of the OR circuit 762 are respectively connected to the Q terminal of the flip-flop circuit 757 and the output terminal of the comparator 761. The analog switch 760 is driven by the output signal of the OR circuit 762 and supply electric power to the IG terminal of the power circuit 74. The analog switch 760 corresponds to the transistor 21 shown in FIG. 1.

Operation of the power drive circuit 75 is described with reference to FIG. 7.

When the rotor of the AC generator 1 rotates, a self-excited AC voltage, such as 0.2–0.4 V, is induced in the U-phase-winding 31 and the V-phase-winding 32 because of their residual magnetic flux. The frequency of the AC voltage is expressed as follows: P1·N/60 [Hz], wherein 2P1 is the number of poles of the AC generator, and N is the number of revolutions of the rotor per minute.

The comparator 751 compares the AC voltage of the U-phase-winding 41 with the reference voltage Vref to provide a rectangular voltage signal in1 whose duty ratio is 50% and frequency is P1·N/60. The negative side of the AC voltage of the U-phase-winding 41 is clamped by the rectifier unit 51 at about −0.7 V.

The comparator 752 also compares the AC voltage of the U-phase-winding 42 with the reference voltage Vref to provide a rectangular voltage signal in1 whose duty ratio is 50% and frequency is P1·N/60. The negative side of the AC voltage of the U-phase-winding 42 is also clamped by the rectifier unit 52 at about −0.7 V.

The exclusive OR circuit 753 supplies an output signal to the comparator 756, which compares the output signal of the exclusive OR circuit 753 with the divided voltage Vcc/3. The comparator 755 compares the output signal of the CR circuit 758 with the divided voltage 2·Vcc/3. If the output signal of the CR circuit 758 becomes as high as the divided voltage 2·Vcc/3, the comparator 755 provides a high level output signal (hereinafter referred to Hi-signal) to reset the flip-flop circuit 757.

If the output signal of the CR circuit 758 is lower than the divided voltage 2·Vcc/3, the comparator 755 provides a low level output signal (hereinafter referred to as Lo-signal). In this case, the flip-flop circuit 757 provides Hi-signal at the Q terminal and Lo-signal at the inverted Q terminal. Accordingly, the transistor 759 is turned off, and the capacitor C1 is charged. When the capacitor C1 is charged so that the capacitor voltage Vc becomes as high as 2·Vcc/3, the flip-flop circuit is reset to turn on the transistor 759. Consequently, the capacitor C1 is discharged. In other words, the flip-flop circuit 757 provides Hi-signal at the Q terminal for a fixed duration that corresponds to the time constant of the CR circuit 758. As long as the Q terminal of the flip-flop circuit 757 provides Hi-signal, the analog switch 760 is maintained to be on to operate the power circuit 74.

If the rotor rotates at a low speed, the fixed duration provided by the CR circuit 758 is shorter than the duration of the signal on the set terminal of the flip-flop circuit 757. Therefore, Lo-signal is provided on the set terminal until the capacitor voltage becomes as high as 2·Vcc/3 to reset the flip-flop circuit 757. Accordingly, the signal Out1 of the Q terminal of the flip-flop circuit 757 maintains Lo-signal, and the output signal of the power drive circuit 75 maintains Lo-signal.

If the rotor rotates at a speed higher than a predetermined speed, the duration of the signal applied to the set terminal of the flip-flop circuit 757 becomes shorter than the fixed duration provided by the CR circuit 758. Accordingly, the signal on the set terminal of the flip-flop circuit 757 is Hi-signal when the capacitor voltage becomes as high as 2·Vcc/3 to reset the flip-flop circuit 757. Therefore, the flip-flop circuit 757 maintains Hi-signal at the Q terminal, and the power drive circuit 75 maintains Hi-signal as its output signal Out. In other words, the frequency of the voltages induced in the phase-windings 41 and 42 becomes higher as the rotation speed of the rotor becomes higher, and the duration in which the output signal Out is cut off becomes shorter and shorter until it is continuously provided to always operate the power circuit 74.

For example, it is possible to continuously operate the power circuit of an AC generator having a twelve-pole rotor at the rotation speed of 1000 rpm if: R2 is 100 kΩ; and C1 is 0.1 μF. Generally, it is possible to continuously operate the power circuit of an AC generator having a 2·P1-pole rotor at a speed N1 rpm if the time constant of the CR circuit 758 is 60/(P1·N1) sec.

The comparator 761 provides Hi-signal as a signal Out2 if the battery voltage is higher than a reference voltage Vref2 that corresponds to a no-load battery voltage, e.g. 13 V. The OR circuit 762 provides the signal Out having sufficient power to drive the analog switch 760 even if the flip-flop circuit 757 can not provide sufficient power at the Q terminal when Hi-signal is applied to both the set and reset terminals.

When the key switch is turned off and the engine is stopped, the battery voltage gradually lowers to a voltage lower than 13 V, e.g. 12.8V. Consequently, the comparator 761 changes the output signal from Hi-signal to Lo-signal to turn off the analog switch 760, thereby stopping the operation of the power circuit 74. It takes scores of seconds to completely stop supply of the field current. This gradually decreasing field current demagnetizes the armature core to make the voltage regulator stand ready. Instead of the battery voltage, the frequency or AC voltage of the phase-windings can be used for the above purpose.

Figure 7:
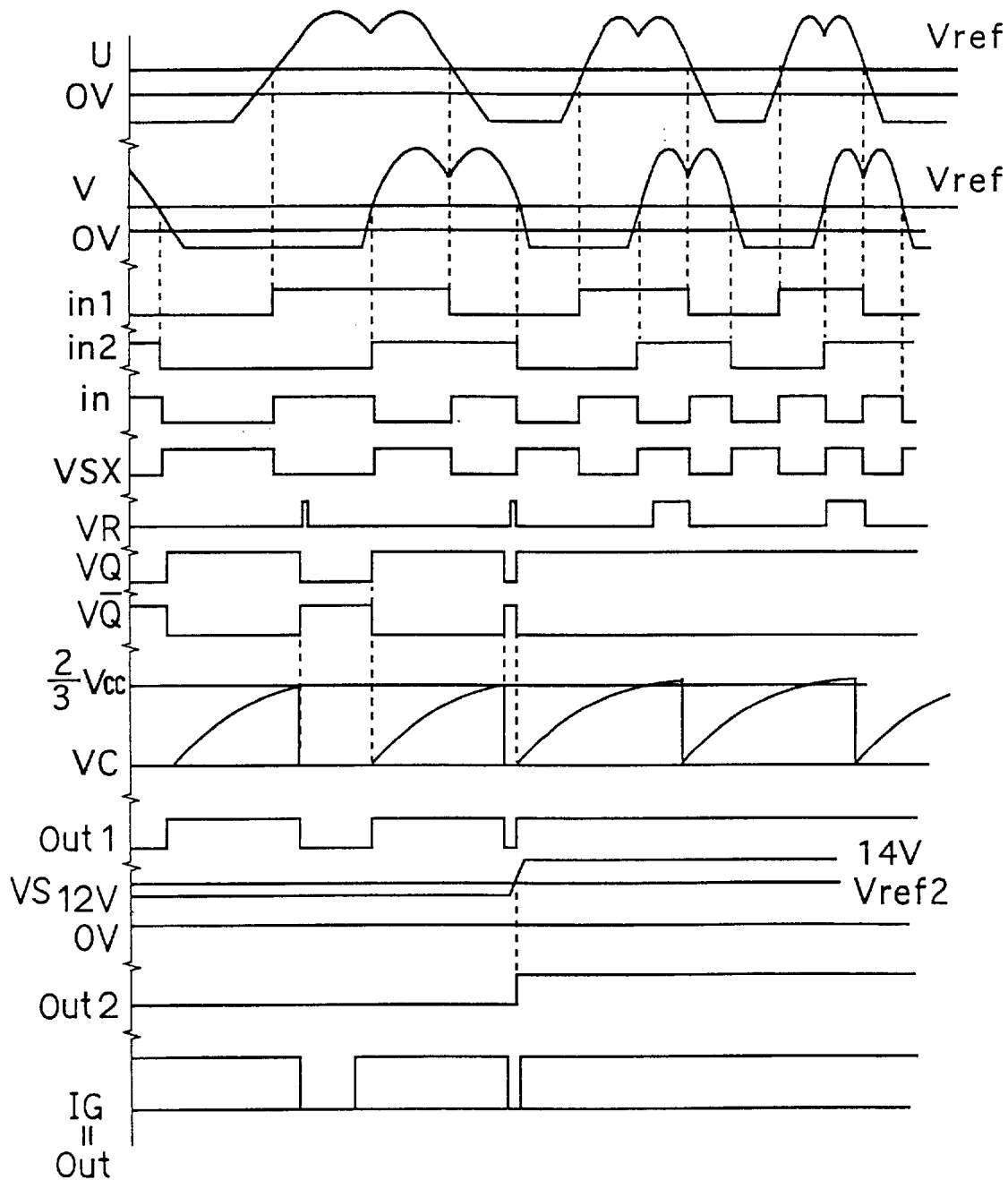
FIG. 7 is a timing chart showing operating conditions of various portions of the voltage regulator.

FIG. 7 shows voltage levels on various portions of the power drive circuit 75. Because the output signal of the power drive circuit 75 is formed from two phase-windings, the operation frequency can be made double the output signal that is formed from a single phase-winding. This can reduce the capacity of capacitors and make detection of the rotation speed more accurate.

Figure 8:
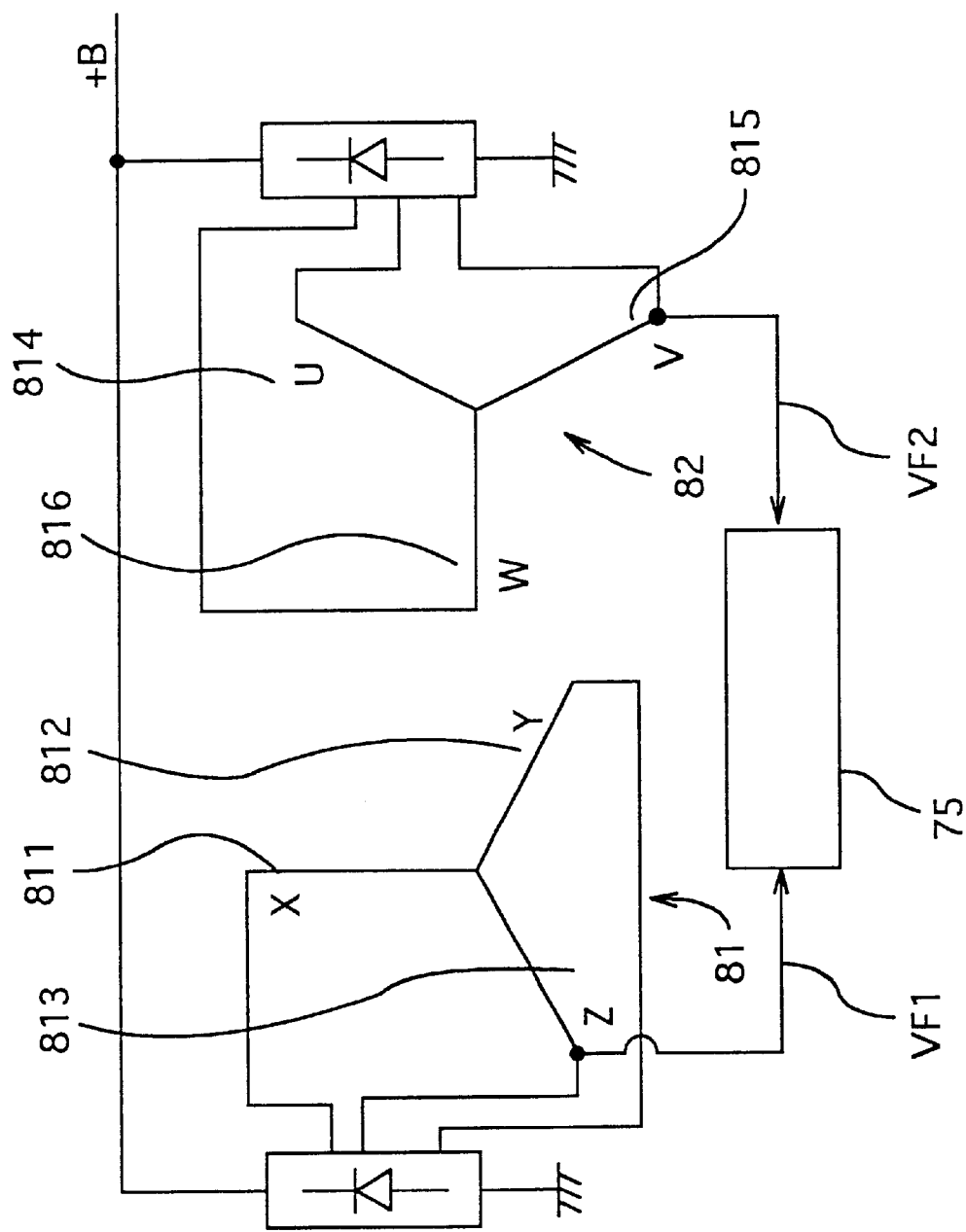
FIG. 8 is a circuit diagram of armature coils and rectifier units of an AC generator to be connected to the voltage regulator according to an embodiment of the invention.

A variation of the AC generator is described with reference to FIG. 8.

The output signal of the power drive circuit 74 is formed from two phase-windings 813 and 815 of an AC generator that are 90° in electric angle different from each other. The terminal voltages VF1 and VF2 are respectively inputted to the comparators 751 and 752 of the power drive circuit shown in FIG. 7.

Figure 9:
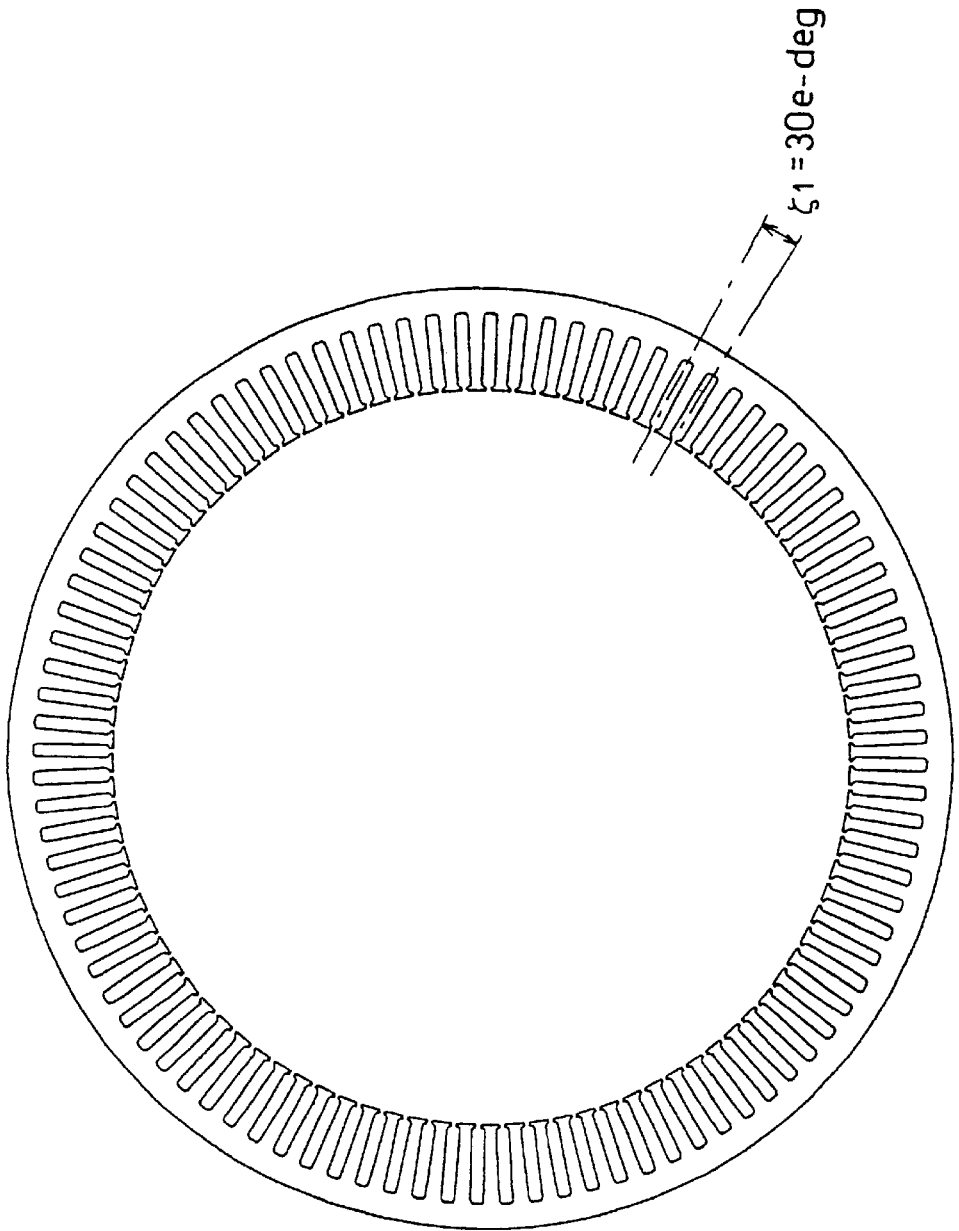
FIG. 9 is a plan view of a stator core of the AC generator shown in FIG. 8.

The AC generator has a pair of three-phase armature coils 81 and 82. The first armature coil 81 has three phase-windings 811, 812 and 813 that generate X, Y and Z-phase AC voltages, and the second armature coil 82 has three phase-windings 814, 815 and 816 that generate U, V and W-phase AC voltage. The X, Y, and Z-phase AC voltages are 120° in electric angle different from each other, and the U, V and W phase AC voltages are also 120° in electric angle different from each other. The X-phase is 30° different from U-phase, the Y-phase is 30° different from V-phase, and the Z-phase is 30° different from W-phase. In other words, the X-phase is 90° different from W-phase, Y-phase is 90° different from U-phase, and the Z-phase is 90° different from V-phase. The AC generator has a stator core that has 96 slots as shown in FIG. 9 and a rotor that has 16 poles. Each slot pitch corresponds to 30° in electric angle. If the rotor has 2P1 poles, the stator core has 12·p1 slots. It is easy to provide the output pulse signal having double the frequencies of the AC generator.

Figure 10:
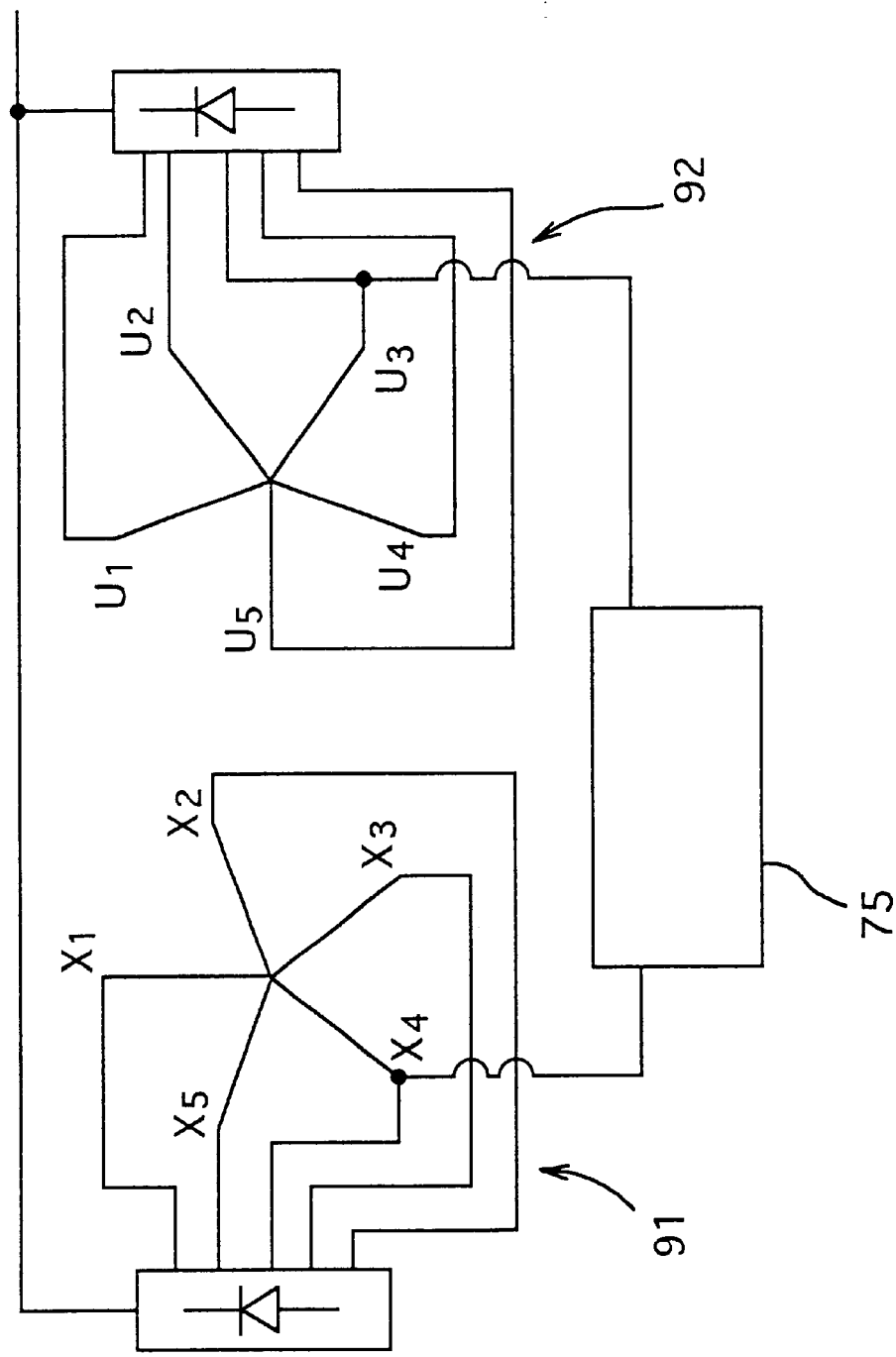
FIG. 10 is a circuit diagram of armature coils and rectifier units of another AC generator to be connected to the voltage regulator according to an embodiment of the invention.

Another variation of the AC generator is described with reference to FIG. 10.

This AC generator has two five-phase armature coils 91 and 92. The first armature coil 91 has five phase-windings X1, X2, X3, X4 and X5, which generate AC voltages at intervals of 72° in electric angle. The second armature coil 92, also, has five phase-windings U1, U2, U3, U4 and U5, which generate AC voltages at intervals of 72° in electric angle.

The X1-phase is 18° different from U1-phase, the X2-phase is 18° different from U2-phase. In the same manner, the X3, X4 and X5-phases are respectively 18° different from U3, U4 and U5-phases. In other words, the X1, X2, X3, X5-phases are respectively 90° different from the U5, U1, U2, U3 and U4-phases.

Figure 11:
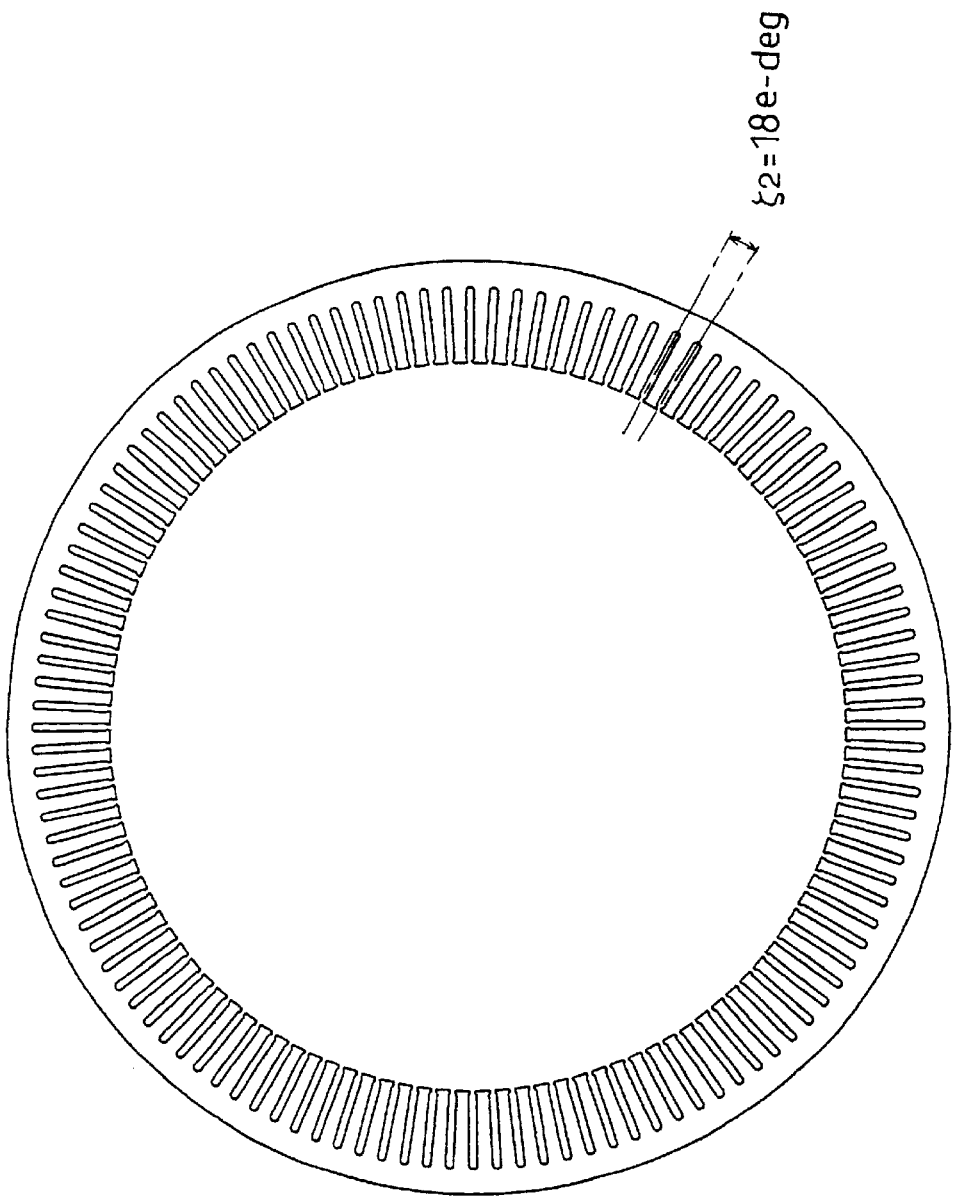
FIG. 11 is a plan view of a stator core of the AC generator shown in FIG. 10.

The AC generator has a 12-pole rotor and 120-slot stator core, as shown in FIG. 11. Each slot pitch corresponds to 18° in electric angle. If the rotor has 2P1 poles, the stator core has 20·p1 slots.

A voltage regulator according to a fourth embodiment of the invention is described with reference to FIGS. 6, 12 and 13.

Figure 12:
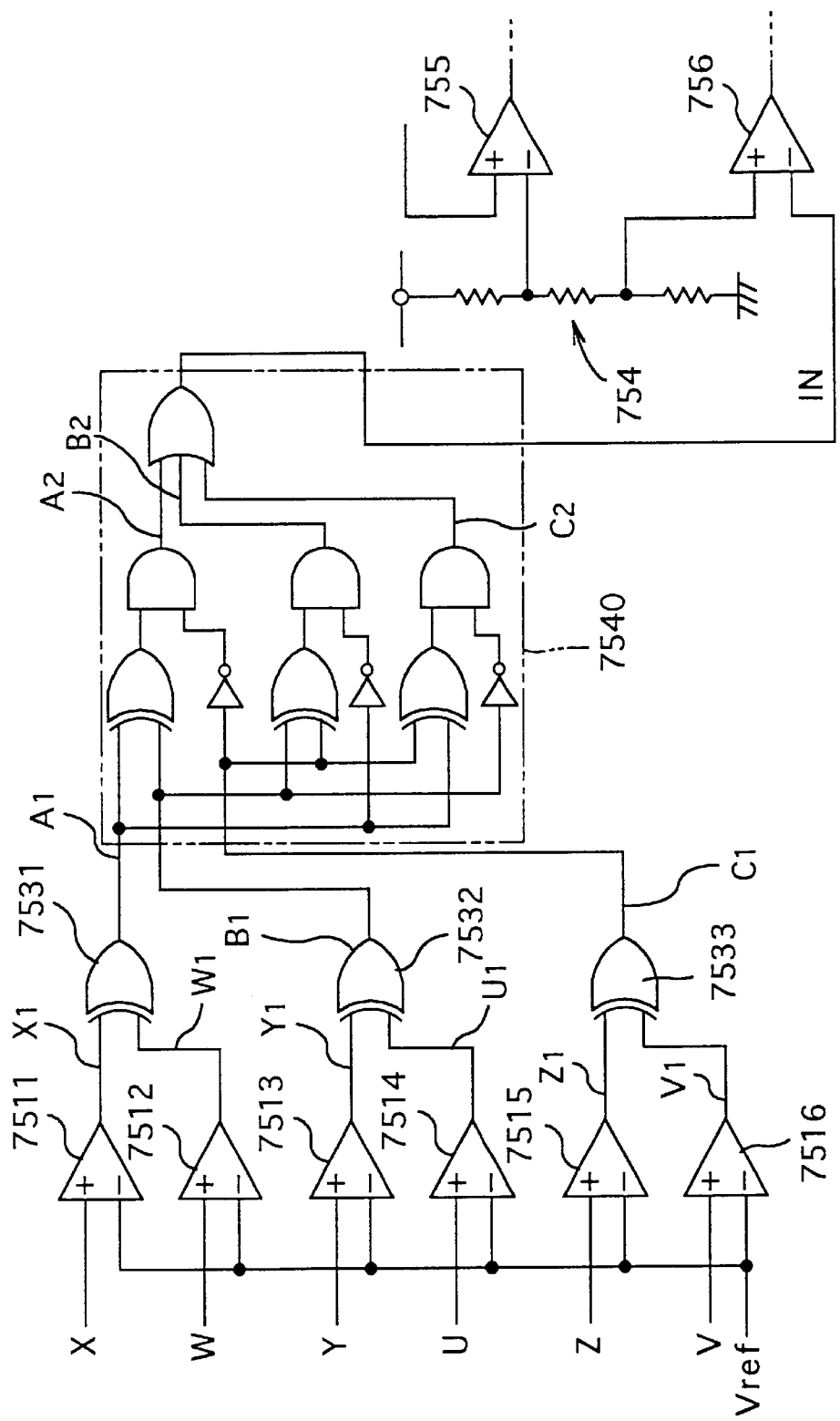
FIG. 12 is a circuit diagram of a portion of a voltage regulator according to a fourth embodiment of the invention.
Figure 13:
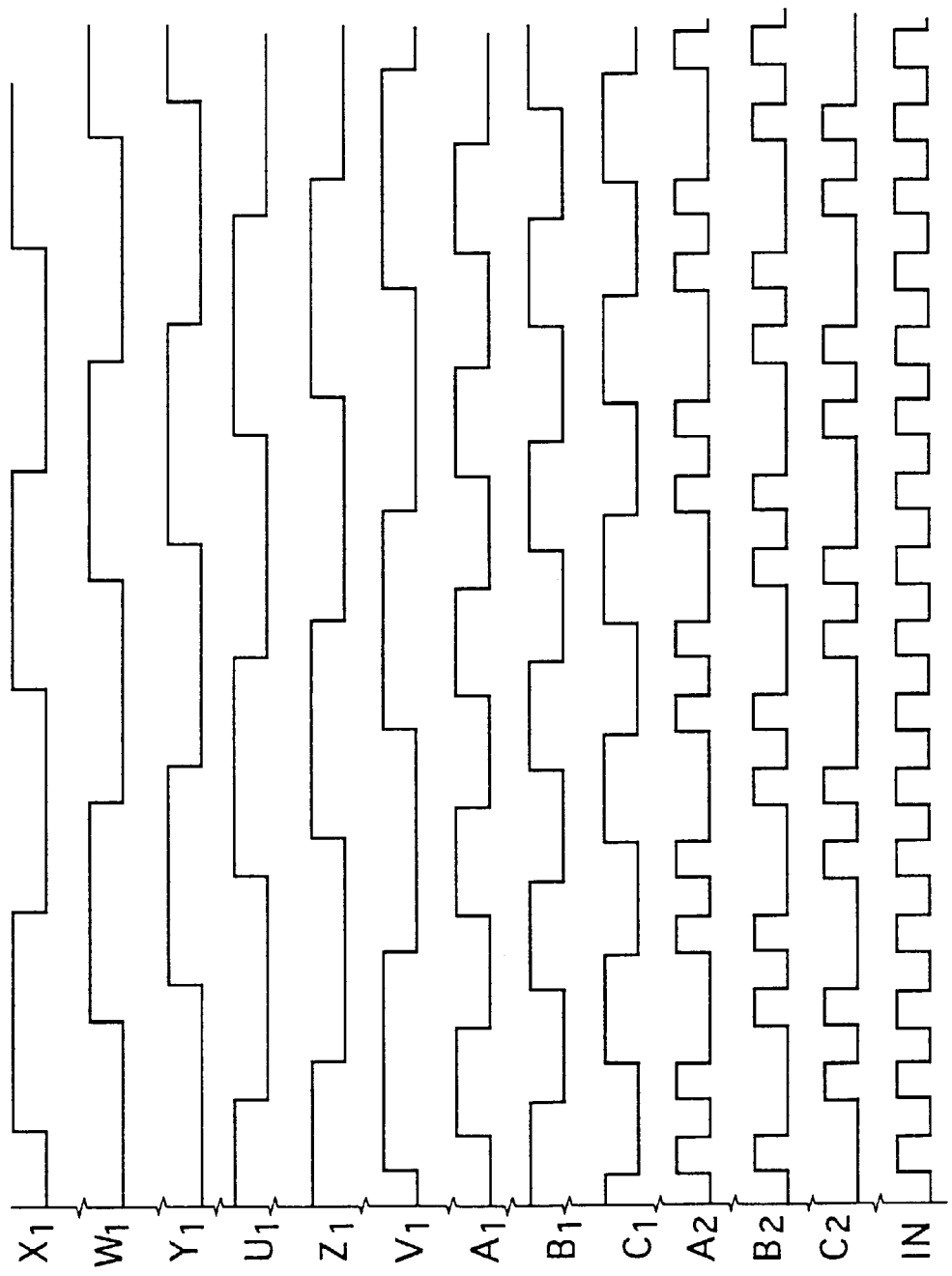
FIG. 13 is a timing chart showing signal voltage levels of various portions of the voltage regulator.

FIG. 12 shows a portion of a power drive circuit that is different from the power drive circuit 75 according to the third embodiment and is connected to the comparators 755 and 756 shown in FIG. 6. The power drive circuit of the voltage regulator according to the second embodiment has six comparators 7511, 7512, 7513, 7514, 7515 and 7516 that are respectively connected to the six phase-windings 811, 812, 813, 814, 815 and 816 of the AC generator shown in FIG. 8. There are three exclusive OR circuits 7531, 7532 and 7533. The first exclusive OR circuit 7531 is connected to the output terminals of the comparators 7511 and 7512, the second exclusive OR circuit 7532 is connected to the output terminals of the comparators 7513 and 7514, and the third exclusive OR circuit 7533 is connected to the output terminals of the comparators 7515 and 7516. The exclusive OR circuits 7531, 7532 and 7533 provide three pulse signals that are 120° in electric angle different from each other. These three pulse signals are processed by a logic circuit 7540 to provide the input signal to be applied to the negative terminal of the comparator 756 shown in FIG. 6. The frequency of the input signal is six times as many as the frequency of the terminal voltages of the phase-windings 811–816. FIG. 13 is a timing chart that shows voltage waves at various portions of the circuit shown in FIG. 12.

Figure 5:
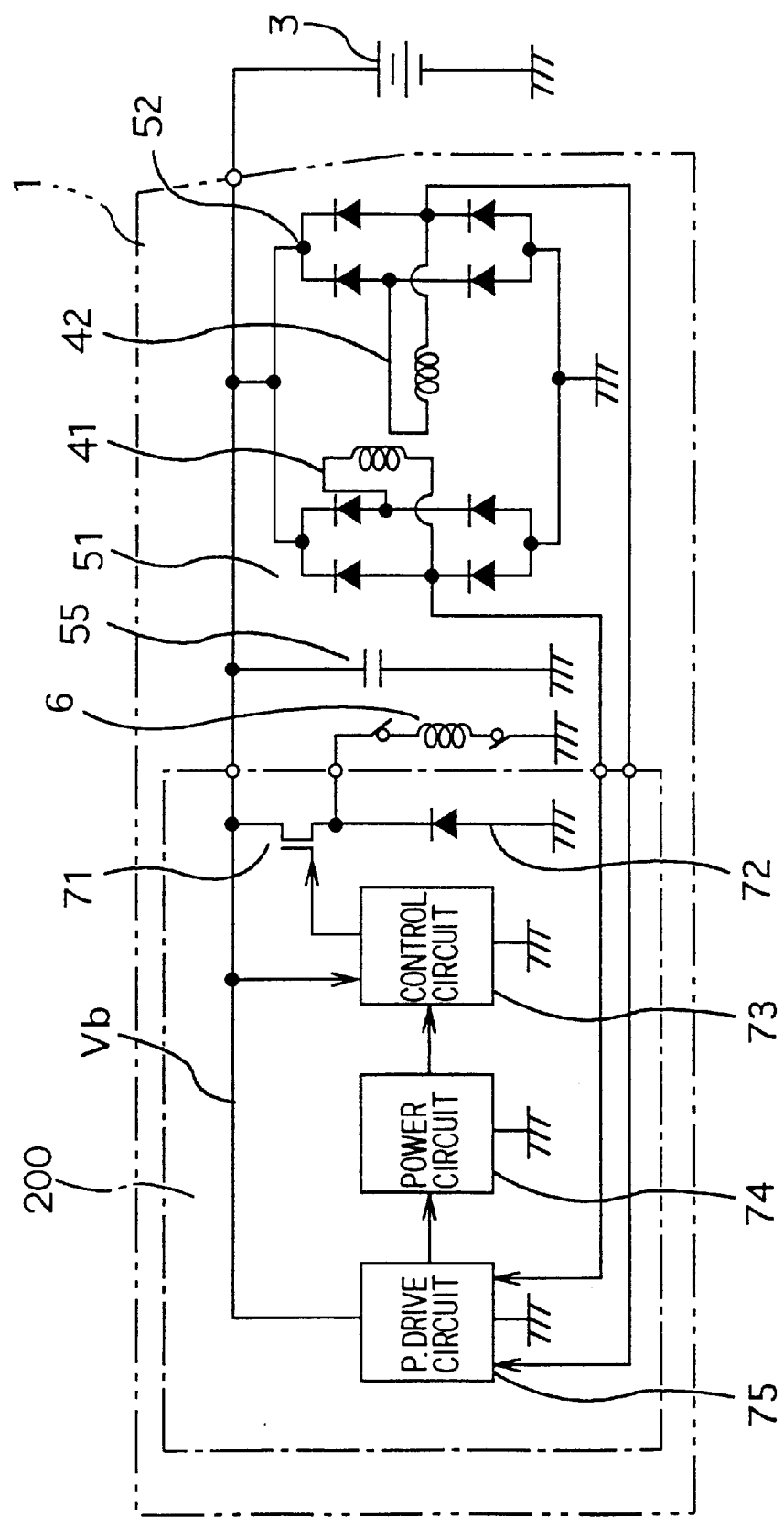
FIG. 5 is a circuit diagram of an AC generator that includes a voltage regulator according to a third embodiment of the invention.
Figure 14:
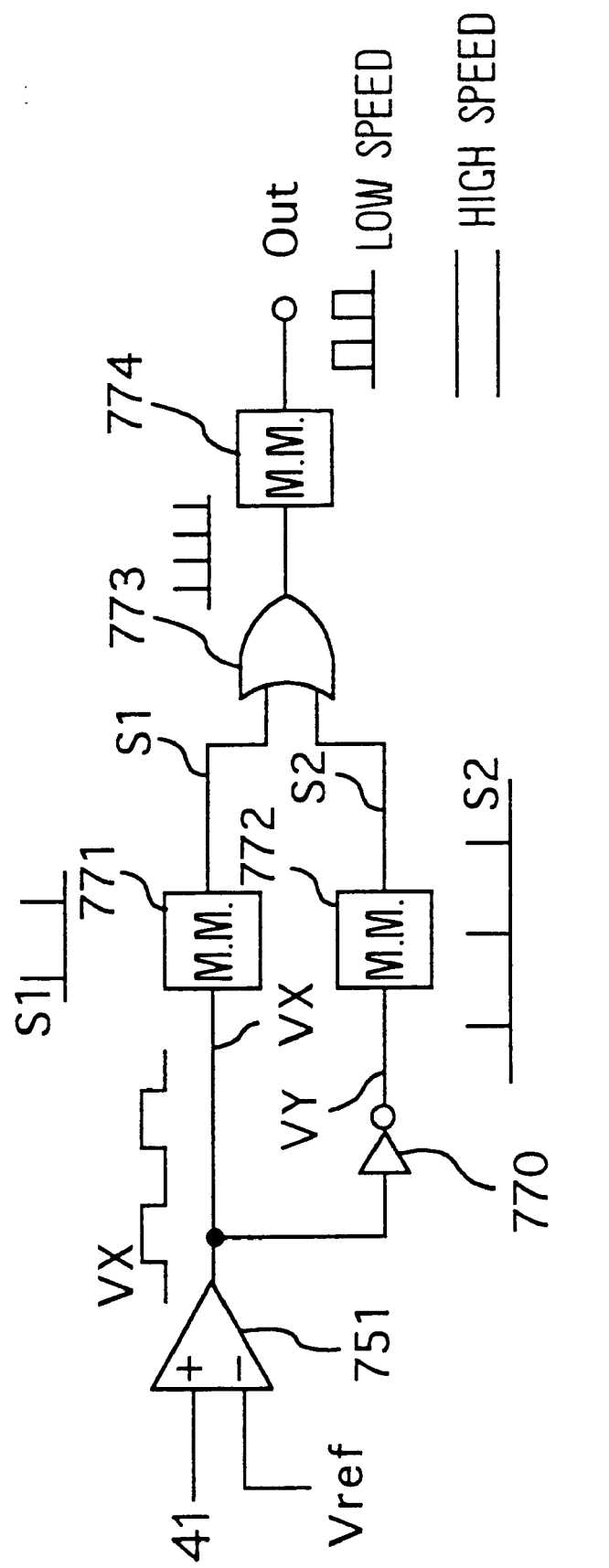
FIG. 14 is a circuit diagram of a portion of a voltage regulator according to a fifth embodiment of the invention.

A voltage regulator according to a fifth embodiment of the invention is described with reference to FIG. 14 that shows a power drive circuit connected to the phase-winding 41 shown in FIG. 5.

The power drive circuit includes a comparator 751, an inverter 770, a pair of mono-stable multi-vibrators 771 and 772, an OR circuit 773 and another mono-stable multi-vibrator 774.

The comparator 751 compares the phase voltage of the phase-winding 41 with a reference voltage Vref to form a binary voltage signal VX, and the inverter forms an inverted voltage signal VY from the signal VX. The pair of mono-stable multi-vibrators 771 and 772 respectively forms short pulse signals S1 and S2 from the signals VX and VY. The pair of short pulse signals S1 and S2 is applied to the third mono-stable multi-vibrator 774 through the OR circuit 773. The third mono-stable multi-vibrator 774 provides a pulse signal Out whose Hi-signal duration is equal to the delay time of the CR circuit 758 shown in FIG. 6. The analog switch 760 shown in FIG. 6 is controlled by the pulse signal Out that has double the frequency of the voltage of the phase-winding 41. This power drive circuit can be used in an ordinary AC generator that has only three phase-windings.

Figure 15:
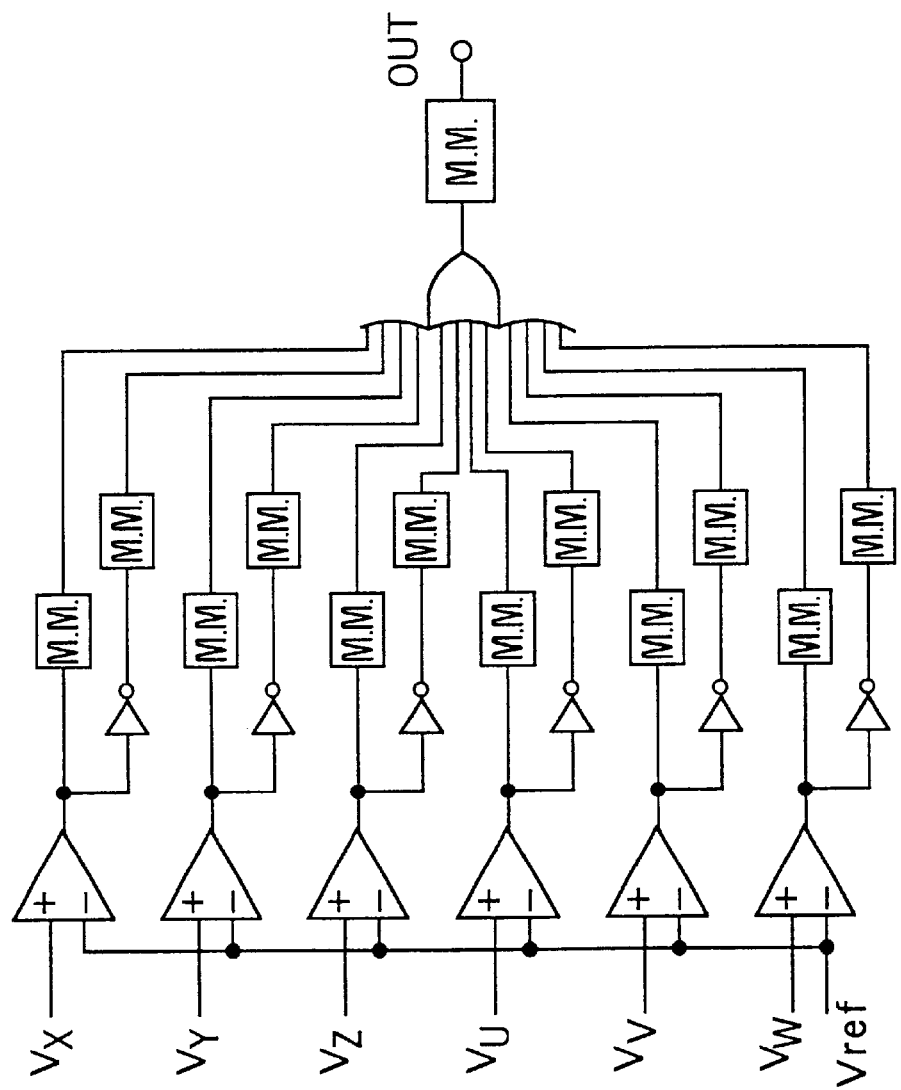
FIG. 15 is a circuit diagram of a portion of a voltage regulator according to a fifth embodiment of the invention.

A voltage regulator according to a sixth embodiment of the invention is described with reference to FIGS. 8 and 15.

This power drive circuit is comprised of six power drive circuits that are substantially the same as the power drive circuit of the regulator according to the fifth embodiment of the invention. In FIG. 15, six comparators are respectively connected to the phase-windings 811–816 of the AC generator shown in FIG. 8. This power drive circuit provides an output signal OUT having 12 times as many frequencies as the phase voltage generated by the phase-windings 811–816.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A voltage regulator of a vehicle AC generator including a field circuit having a field coil and a plurality of magnetic poles and a output circuit having an armature coil, said voltage regulator comprising:

first means, having an input terminal and a detection line connecting said input terminal and said armature coil, for detecting a self-excited voltage that is induced in said armature coil by a residual magnetic flux of said rotor;

second means for supplying field current to said field coil when said self-excited voltage is detected by said first means;

a bypass circuit having a variable resistance, connected between said input terminal and a ground, for bypassing leak current flowing in said armature to the ground; and third means for decreasing said variable resistance of said bypass circuit when said self-excited voltage is not detected and increasing said variable resistance of said bypass circuit when said self-excited voltage is detected.

2. The voltage regulator as claimed in claim 1, wherein said third means comprises a switching circuit connected to said bypass circuit.

3. The voltage regulator as claimed in claim 1, wherein said third means comprises a circuit for decreasing said resistance of said bypass resistor after increasing said resistance for a predetermined duration.

4. The voltage regulator as claimed in claim 1, wherein said first means comprises a power drive circuit including a pulse conversion circuit for converting said self-excited voltage into a binary pulse signal;

said second means comprises a control circuit for controlling said field current, and a power circuit connected to said control circuit, wherein said power-drive circuit supplies electric power to said power circuit according to said binary pulse signal.

5. The voltage regulator as claimed in claim 4, wherein said armature coil of said AC generator include a plurality of phase-windings; and said pulse conversion circuit comprises a number of comparators respectively connected to the same number of said phase-windings to convert said self-excited voltage into a binary pulse signal having the same number of times as many frequencies as said self-excited voltage.

6. The voltage regulator as claimed in claim 1, wherein said first means detects a voltage level of said self-excited voltage.

7. The voltage regulator as claimed in claim 1, wherein said first means detects the frequency of said self-excited voltage.

8. A voltage regulator of a vehicle AC generator including a field circuit having a field coil and a plurality of magnetic poles and an output circuit having an armature coil, said voltage regulator comprising:

a control circuit for supplying field current to said field coil;

a power circuit for supplying electric power to said control circuit to operate the same;

first means, including input terminal and a detection line connecting said input terminal to said armature coil, for detecting a self-excited voltage generated in said armature coil;

a power drive circuit for controlling said power circuit according to a self-excited voltage induced in said armature coil, said power drive circuit including a pulse conversion circuit for converting said self-excited voltage into a binary pulse signal;

a bypass circuit having a variable resistance, connected between said input terminal and a ground, for bypassing leak current flowing in said armature to the ground; and second means for decreasing said variable resistance of said bypass circuit when said self-excited voltage is not detected and increasing said variable resistance of said bypass circuit when said self-excited voltage is detected.

9. A voltage regulator of a vehicle AC generator for charging a battery, said AC generator including a field circuit having a field coil and a plurality of magnetic poles, an output circuit having a plurality of phase-windings and a rectifier unit for providing DC output power, said voltage regulator comprising:

means, including and input terminal and a detection line connecting said input terminal to a portion of said phase windings, for detecting a self-excited voltage that is induced in said phase-windings by a residual magnetic field;

a switching circuit for controlling field current to be supplied to said field coil;

a switch control circuit for controlling said switching circuit;

a power circuit connected to said switch control circuit; and a power-drive circuit including a pulse conversion circuit for converting said self-excited voltage into a binary pulse signal, said power-drive circuit driving said power circuit for a predetermined period from an edge of said binary pulse signal, wherein said pulse conversion circuit comprises a comparator connected to one of said phase-windings and a flip flop circuit connected to said comparator.

10. The voltage regulator as claimed in claim 9, wherein said pulse conversion circuit forms said binary pulse signal having a plurality of times as many frequency as a frequency of an output voltage.

11. The voltage regulator as claimed in claim 9, wherein said power-drive circuit forms said binary pulse signal having two times as many frequencies as a frequency of an output voltage from a pair of said phase-windings whose phases are 90° different from each other.

12. The voltage regulator as claimed in claim 9, wherein said power-drive circuit drives said power circuit when said rectifier unit provides an output voltage that is higher than a predetermined voltage.

13. The voltage regulator as claimed in claim 9, wherein said power drive circuit has a switch for opening or closing a circuit connecting said battery and a power line.

\* \* \* \* \*